Nov. 21, 1950        E. H. SMITH        2,531,006
TIP FOR CUTTING BLOWTORCHES
Filed Dec. 30, 1946
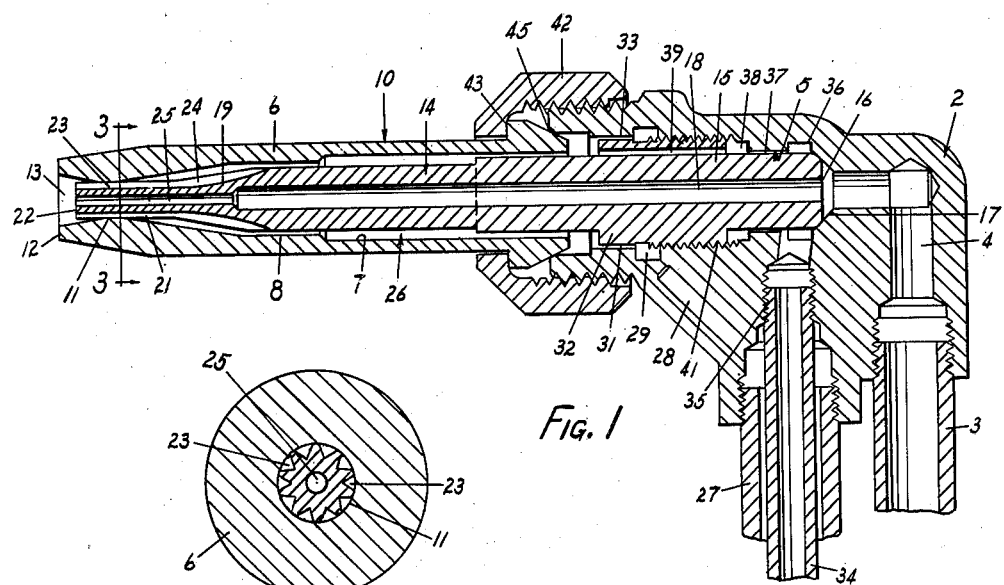
Fig. 1
Fig. 3
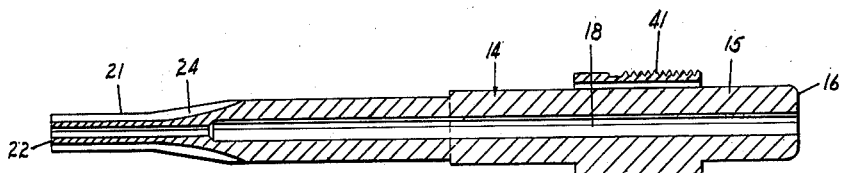
Fig. 2
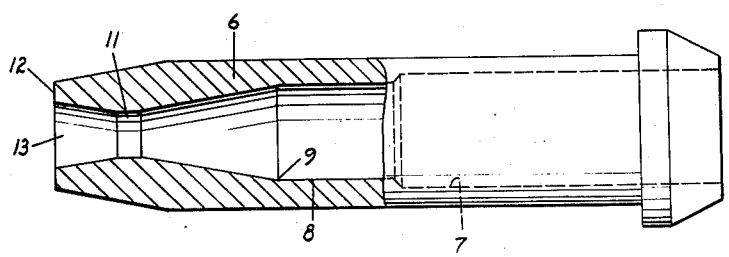
Fig. 4
INVENTOR
ELMER H. SMITH
BY Paul, Paul + Moore
ATTORNEYS Patented Nov. 21, 1950

2,531,006

UNITED STATES PATENT OFFICE 2,531,006

TIP FOR CUTTING BLOWTORCHES

Elmer H. Smith, Minneapolis, Minn., assignor to Smith Welding Equipment Corporation, Minneapolis, Minn., a corporation of Minnesota Application December 30, 1946, Serial No. 719,323

2 Claims. (Cl. 158—27.4)

This invention relates to new and useful improvements in cutting tips utilizing a preheating flame for heating the work prior to the cutting operation, which is accomplished by a suitable cutting gas. In the operation of conventional oxy-acetylene cutting torches, or other cutting torches utilizing a preheating flame, it is of utmost importance that the preheating flame initially directed against the work be sufficiently intense to quickly heat the work to a temperature which will support combustion of the cutting gas when the cutting gas is subsequently directed against the preheated work.

Cutting tips, as now commonly constructed, are usually composed of an inner and an outer member, the inner member usually having an axially disposed cutting gas passage therein for conducting the cutting gas against the preheated work, and the outer member providing a plurality of preheating fuel gas orifices for a preheating flame. In such well known cutting tips the inner member usually has a reduced terminal portion received in a cylindrical terminal bore provided in the outer member. In some instances, as in this particular case, the fuel gas preheating orifices may be formed by providing longitudinally extending grooves in the periphery of the reduced terminal end portion of the inner member, whereby when said member is fitted into the outer member, a plurality of annularly spaced preheating orifices are formed around the central cutting gas orifice of the inner member. In other types of tips, the preheating orifices may be formed by providing a series of small holes or apertures in the outer member only.

In both such constructions, the preheating orifices and passages provided around the central cutting gas orifice are usually disposed in parallel relation thereto, and extend to the terminal end of the torch tip. This results in the production of a comparatively long preheating flame because of the high velocity of the fuel gas as it leaves the preheating fuel orifices of the torch tip. Such a long preheating flame is undesirable, because the point of greatest flame intensity of the preheating flame may be spaced a considerable distance outwardly from the terminal of the cutting tip, whereby a portion of the preheating temperature of the flame may be lost to the atmosphere, with a resultant loss in efficiency. To obtain maximum cutting efficiency, the spacing between the preheated work and the terminal of the cutting tip should be as short as possible, because the cutting flame is dependent entirely upon the temperature of the work, and if the work is not heated to the proper temperature close to the tip end, the cutting operation may be impaired, and even interrupted, if the temperature of the work is not sufficiently high to support combustion of the cutting gas during the cutting operation.

The novel cutting tip herein disclosed is the result of long experimental and development work in an attempt to produce a cutting tip which is highly efficient in operation, and which is so constructed that it produces a more concentrated flame than has heretofore been possible, whereby the initial preheating of the work may be accomplished in a relatively shorter period of time, thereby expediting the cutting operation, and also minimizing the danger of "losing" the cut because of the metal not being sufficiently heated ahead of the jet of cutting gas.

An object of the present invention, therefore, is to provide a cutting tip of the class described which presents the utmost in simplicity of construction, and which is so designed that the velocity of the preheating fuel gases is greatly reduced at the point of discharge from the tip terminal, whereby the cutting gas orifice of the tip may be held relatively closer to the work than is possible with conventional tips now in use, thereby greatly increasing the efficiency of the tip.

A further object of the invention is to provide a composite tip of simple and inexpensive construction which readily lends itself to mass production.

A further and more specific object is to provide a cutting tip comprising an outer member having a longitudinally extending bore therein which tapers to a reduced bore located at a point spaced inwardly from the tip terminal, and a frusto-conical bore extending outwardly from said reduced bore to the end of the tip, and providing, in effect, an expansion chamber into which the preheating fuel gases are discharged from the preheating orifices, thereby reducing the velocity of the discharging fuel gases whereby the zone of greatest flame intensity of the preheating flame may be disposed relatively closer to the terminal of the tip than has heretofore been possible in conventional tips.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a view showing a cutting torch head with a cutting tip mounted therein and embodying the invention;

Figure 2 is a view showing the inner tip member or core removed from the torch head;

Figure 3 is a cross-sectional view on the line 3—3 of Figure 1; and

Figure 4 is a detail view partially in section of the outer tip member removed from the torch head to more clearly illustrate the formation of the outwardly flared terminal bore provided therein.

In the selected embodiment of the invention herein disclosed there is illustrated in Figure 1, for purposes of disclosure, a torch head of more or less conventional construction, comprising a body 2 having one end of a tube 3 secured thereto, the opposite end of which is secured to the usual handle and control valve portion of the cutting torch assembly, not shown.

The tube 3 conducts a cutting gas, such as oxygen, to the torch tip in the usual manner. A passage 4 leads from the tube 3 to a bore 5 provided in the body of the torch head.

The invention herein disclosed is directed more particularly to the construction of the torch tip, generally designated by the numeral 10. The torch tip 10, as clearly illustrated in Figure 1, comprises an outer member 6 having a stepped bore 7 therein which is reduced in diameter, as indicated at 8, and from the point 9, the bore 8 tapers inwardly to a reduced cylindrical bore 11, which is spaced inwardly from the end 12 of the tip member 6, as best shown in Figure 4.

An important feature of the invention resides in the outwardly flared or frusto-conical bore 13 which extends from the reduced cylindrical bore 11 to the end 12 of the tip member 6. The taper of the wall of the frusto-conical bore 13 may, of course, be varied if desired. In actual practice, I have found that an included angle of approximately 15° provides highly efficient results.

Shown secured within the outer tip member 6 is an inner tip member 14 which has a cylindrical end portion 15 projecting from the rear end of the tip 10, as best shown in Figure 2. The end portion 15 is received in the bore 5 of the head, and has its inner end 16 seated against a seat 17 provided in the torch head, whereby the central cutting gas passage 18 provided in the inner tip member 14 is in direct communication with the passage 4 provided in the head so that cutting gas or oxygen may flow from the tube 3 to the cutting passage 18 of the tip member 14, when the oxygen control valve, not shown, is open.

The opposite end portion 19 of the inner tip member 14 is inwardly tapered and terminates in a cylindrical portion 21 adapted to be fitted within the reduced bore 11 of the outer member, as clearly illustrated in Figure 1. The end 22 of the inner tip member 14 projects into the conical bore 13, but stops short of the end 12 of the outer tip member 6, as shown in Figure 1.

In the form of tip herein disclosed, the preheating fuel gas orifices 23 are formed by longitudinally grooving the periphery of the end portion 21 of the inner member, as shown at 24 in Figure 1, whereby when the end portion 21 of the inner member is fitted into the reduced bore 11 of the outer member, a plurality of annularly spaced preheating fuel passages or orifices 23 are provided at the outer end of the composite torch tip, which completely encircle the cutting gas orifice 25. By reference to Figure 1 it will be noted that the axially disposed cutting gas passage 18 in the inner member communicates at its outer end with the reduced passage 25, which extends through the reduced end portion of the inner tip 14.

The preheating fuel passages 24 are in direct communication with the annular fuel gas chamber 26 provided between the inner and outer tip members 6 and 14, respectively, as shown in Figure 1. Fuel gas such as acetylene is delivered to the fuel chamber 26 from a tube 27 connected to the usual handle and valve portion of the torch assembly. The tube 27 is in communication with one end of a passage 28, provided in the head 2, and the opposite end of the passage 28 communicates with an annular groove or chamber 29 which in turn is in communication with a restricted annular passage 31 provided between the enlarged portion 32 of the inner tip member 6, and the wall of an enlarged bore 33, provided in the torch head. The restricted passage 31 communicates with one end of the chamber 26, as will be understood by reference to Figure 1.

To provide a combustible fuel mixture, oxygen must be intermixed with the fuel gas as is well known in devices of this kind. Such oxygen may be supplied to the mixing chamber 26 from a supply tube 34 which has one end connected to the usual handle and valve portion of the torch and its opposite end is secured in the torch head as shown at 35, and communicates with an annular chamber 36. A restricted passage 37 connects the chamber 36 with a similar chamber 38 which in turn is in communication with the mixing chamber 26 through a plurality of small ducts 39.

By reference to Figures 1 and 2, it will be noted that the inner tip member 14 is provided with a threaded portion 41 which is adapted to be received in threaded engagement with the torch head 2, as shown in Figure 1. The outer tip member 6 is shown secured to the torch head by a nut 42 engaging a shoulder 43 provided on a head 44 of the outer tip member 6. The head 44 has a conical wall portion adapted to engage a seat 45 in the head 2, thereby to prevent leakage from the connection between the tip and torch head when the torch is in use.

The improved cutting torch herein disclosed is used in the usual manner by first manipulating the fuel mixture control valves, not shown, to produce the proper fuel mixture for the preheating flame. The fuel gas is projected from the preheating orifices 23 into the frusto-conical bore 13, where it is ignited in the usual manner to start the preheating flame. As the fuel gas is projected into the conical bore 13 of the outer tip member 6, it immediately expands whereby its velocity is materially reduced so that the effective preheating flame commences very close to the end of the tip or bore 13, whereby the preheating flame is rendered relatively more intense at a point closer to the tip end than is possible with conventional torch tips which project the fuel gases from the preheating orifices at a relatively higher velocity. In such conventional cutting tips, the relatively higher velocity of the preheating fuel gas as it leaves the preheating orifices, is such as to cause the effective preheating flame to be spaced outwardly from the tip end whereby the preheating flame loses some of its intensity to the atmosphere which may impair the operation of the cutting torch.

By constructing a cutting tip such as herein disclosed, more of the heat generated by the burning fuel gas is utilized than is possible with conventional tips, because of the relatively higher velocity of the fuel gases of such conventional torch tips. This feature is particularly desirable when starting to cut a piece of metal because the metal may be heated to the desired temperature to support combustion of the cutting gas in a shorter period of time because of the relatively greater intensity of the preheating flame close to the tip end.

Also by increasing the intensity of the preheating flame close to the tip end, relatively less preheating temperature is lost to the atmosphere than when using conventional cutting tips, whereby there is less likelihood of "losing" the cut because of the metal not being sufficiently heated ahead of the jet of cutting gas. The invention may readily be embodied in a cutting tip of the type disclosed without noticeably increasing the cost and it does not complicate the assembling of the parts of the torch tip nor its mounting in the torch head 2.

The terminal end 22 of the inner tip member 14 preferably extends well into the frustoconical or tapered bore 13 of the outer tip member 6, whereby the cutting gas orifice may be located extremely close to the location of greatest flame intensity of the preheating flame, so that instant combustion of the cutting gas results each time the operator opens the usual cutting gas valve, subsequent, of course, to the preheating of the metal.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a cutting tip of the class described, an outer member having an enlarged axial bore therein, the wall of said bore tapering inwardly to a restricted cylindrical bore and terminating in an outwardly tapering bore at the discharge end of the tip, an inner member having a portion fitting in said enlarged bore and having a reduced cylindrical end portion fitting in said restricted cylindrical bore and extending into the outwardly tapering terminal bore of the outer member, said reduced cylindrical end portion having longitudinally extending grooves in its periphery cooperating with the wall of said restricted cylindrical bore to form a plurality of preheating orifices, the reduced cylindrical end portion of said inner member terminating short of the adjacent end of the outer member, whereby said outwardly tapering terminal bore forms an expansion chamber for the preheating flame.

2. In a cutting tip of the class described, an outer member having an enlarged axial bore therein, the wall of said bore tapering inwardly to a restricted cylindrical bore at the discharge end of the tip, an inner member having a portion fitting in said enlarged bore and having a restricted cylindrical end portion fitting in the restricted cylindrical bore of said outer member, the periphery of the enlarged portion of said inner member being spaced from the wall of the bore of the outer member to provide an annular fuel passage, and said inner member having a tapered portion merging its reduced cylindrical end portion with its enlarged body portion, and a plurality of circumferentially spaced longitudinally extending grooves in the periphery of the reduced cylindrical portion of the inner member cooperating with the wall of the reduced cylindrical bore in the outer member to provide a plurality of preheating orifices at the discharge end of the tip.

ELMER H. SMITH.

REFERENCES CITED

The following references are of record in the file of this patent:

UNITED STATES PATENTS

| Number | Name | Date |
|---|---|---|
| 1,726,327 | Walker | Aug. 27, 1929 |
| 1,949,780 | Campbell | Mar. 6, 1934 |
| 1,977,782 | Thomas | Oct. 23, 1934 |
| 2,175,160 | Zobel et al. | Oct. 3, 1939 |
| 2,378,346 | Wigton | June 12, 1945 |

FOREIGN PATENTS

| Number | Country | Date |
|---|---|---|
| 540,880 | Great Britain | Nov. 4, 1941 |
| 825,503 | France | Dec. 8, 1937 |